(12) United States Patent
Nagashima et al.

(10) Patent No.: US 11,565,369 B2
(45) Date of Patent: Jan. 31, 2023

(54) METHOD OF GRINDING WORKPIECE

(71) Applicant: DISCO CORPORATION, Tokyo (JP)

(72) Inventors: Masaaki Nagashima, Tokyo (JP); Naoto Takata, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 81 days.

(21) Appl. No.: 17/178,550

(22) Filed: Feb. 18, 2021

(65) Prior Publication Data

US 2021/0276145 A1 Sep. 9, 2021

(30) Foreign Application Priority Data

Mar. 4, 2020 (JP) .............................. JP2020-036701

(51) Int. Cl.
*B24B 7/22* (2006.01)
*B24B 41/06* (2012.01)

(52) U.S. Cl.
CPC .............. *B24B 41/06* (2013.01); *B24B 7/228* (2013.01)

(58) Field of Classification Search
CPC ................................ B24B 7/228; B24B 41/06
USPC .......................................................... 451/20
See application file for complete search history.

(56) References Cited

U.S. PATENT DOCUMENTS

| 2017/0095902 A1* | 4/2017 | Yoshida .................. B24B 7/228 |
| 2017/0226380 A1* | 8/2017 | Gagliardi ................ B24B 37/26 |
| 2017/0301549 A1* | 10/2017 | Suzuki .................... B24B 19/02 |

FOREIGN PATENT DOCUMENTS

| JP | 2009072851 A | 4/2009 |
| JP | 2014166937 A | 9/2014 |
| JP | 2016111147 A | 6/2016 |

* cited by examiner

*Primary Examiner* — Don M Anderson
*Assistant Examiner* — Caleb Andrew Holizna
(74) *Attorney, Agent, or Firm* — Greer, Burns & Crain, Ltd.

(57) ABSTRACT

A method of grinding a surface of a workpiece that has surface irregularities includes a first grinding step of grinding the surface of the workpiece by a predetermined amount of stock removal while keeping a measuring element of a height gauge out of contact with the surface of the workpiece, thereafter, a height difference measuring step of bringing the measuring element of the height gauge into contact with the surface of the workpiece and measuring a height difference of surface irregularities on the surface of the workpiece with the height gauge, and a second grinding step of, if the measured height difference is larger than a preset range, grinding the surface of the workpiece while keeping the measuring element of the height gauge in contact with the surface of the workpiece until the measured height difference falls within the preset range.

5 Claims, 6 Drawing Sheets

US 11,565,369 B2

METHOD OF GRINDING WORKPIECE

BACKGROUND OF THE INVENTION

Field of the Invention

The present invention relates to a method of grinding a workpiece.

Description of the Related Art

In order to planarize both surfaces of a workpiece sliced from a semiconductor ingot, the surfaces of the sliced workpiece are ground. For example, after one surface of a workpiece has been ground, the other surface of the workpiece is ground while the thickness of the workpiece is being measured, as disclosed in Japanese Patent Laid-open No. 2009-072851. The workpiece can thus be ground to a predetermined thickness.

SUMMARY OF THE INVENTION

According to the technology disclosed in Japanese Patent Laid-open No. 2009-072851, the thickness of the workpiece is measured while the probe of a height gauge is being held in contact with the other surface of the workpiece. However, in a case where at least the other surface of the workpiece has large surface irregularities, the probe tends to bounce off the other surface and possibly finds it difficult to measure the thickness of the workpiece.

It is therefore an object of the present invention to provide a method of grinding a workpiece having large surface irregularities on its surface to a predetermined thickness.

In accordance with an aspect of the present invention, there is provided a method of grinding a surface of a workpiece that has surface irregularities with grindstones, including a holding step of holding the workpiece on a chuck table, a first grinding step of rotating the workpiece held on the chuck table and grinding the surface of the workpiece with the grindstones by a predetermined amount of stock removal while keeping a measuring element of a height gauge out of contact with the surface of the workpiece, a height difference measuring step of bringing the measuring element of the height gauge into contact with the surface of the workpiece that has been ground in the first grinding step and measuring a height difference of the surface irregularities on the surface of the workpiece with the height gauge, and a second grinding step of, if the height difference measured in the height difference measuring step falls within a preset range, stopping grinding the surface of the workpiece, and, if the measured height difference is larger than the preset range, grinding the surface of the workpiece while keeping the measuring element of the height gauge in contact with the surface of the workpiece until the measured height difference falls within the preset range.

Preferably, the workpiece may include a plate-shaped object peeled off from an ingot made of a single crystal of silicon carbide and having a first surface, a second surface opposite the first surface, a c-axis extending from the first surface to the second surface and inclined at an off-angle to a line normal to the first surface, and a c-plane perpendicular to the c-axis, by repeatedly forming modified layers in the ingot by applying a laser beam having a wavelength transmittable to the ingot through the first surface thereof and linearly moving a focused spot of the laser beam relatively to the ingot in a second direction perpendicular to a first direction in which the off-angle is formed, repeatedly indexing-moving the focused spot of the laser beam relatively to the ingot by a predetermined indexing distance in the first direction, forming division initiating points of the modified layers and cracks extending from the modified layers in the first direction along the c-plane, and applying external forces to the division initiating points to peel off the plate-shaped object along the division initiating points as a boundary, and the surface of the workpiece that has the surface irregularities includes a surface of the plate-shaped object to be peeled off that is opposite the first surface.

Alternatively, the workpiece may include the ingot from which the plate-shaped object is peeled off, and the surface of the workpiece to be ground that has the surface irregularities may include a surface of the ingot from which the plate-shaped object has been peeled off.

Preferably, the method may further include, before the first grinding step is started, an amount-of-stock removal calculating step of calculating the predetermined amount of stock removal in the first grinding step according to the equation: amount of stock removal=indexing distance×tan (off-angle).

In the method according to the present invention, the surface of the workpiece is planarized, i.e., ground, before the height of the ground surface is measured by the height gauge. Consequently, the measuring element of the height gauge is restrained from bouncing off the ground surface and hence from finding it difficult to measure the height of the ground surface. In the second grinding step, therefore, it is possible to grind the workpiece with the grindstones while measuring the height of the surface of the workpiece with the height gauge until the height difference of the surface irregularities falls within the preset range.

The above and other objects, features and advantages of the present invention and the manner of realizing them will become more apparent, and the invention itself will best be understood from a study of the following description and appended claims with reference to the attached drawings showing some preferred embodiment of the invention.

DETAILED DESCRIPTION OF THE PREFERRED EMBODIMENT

Figure 1:
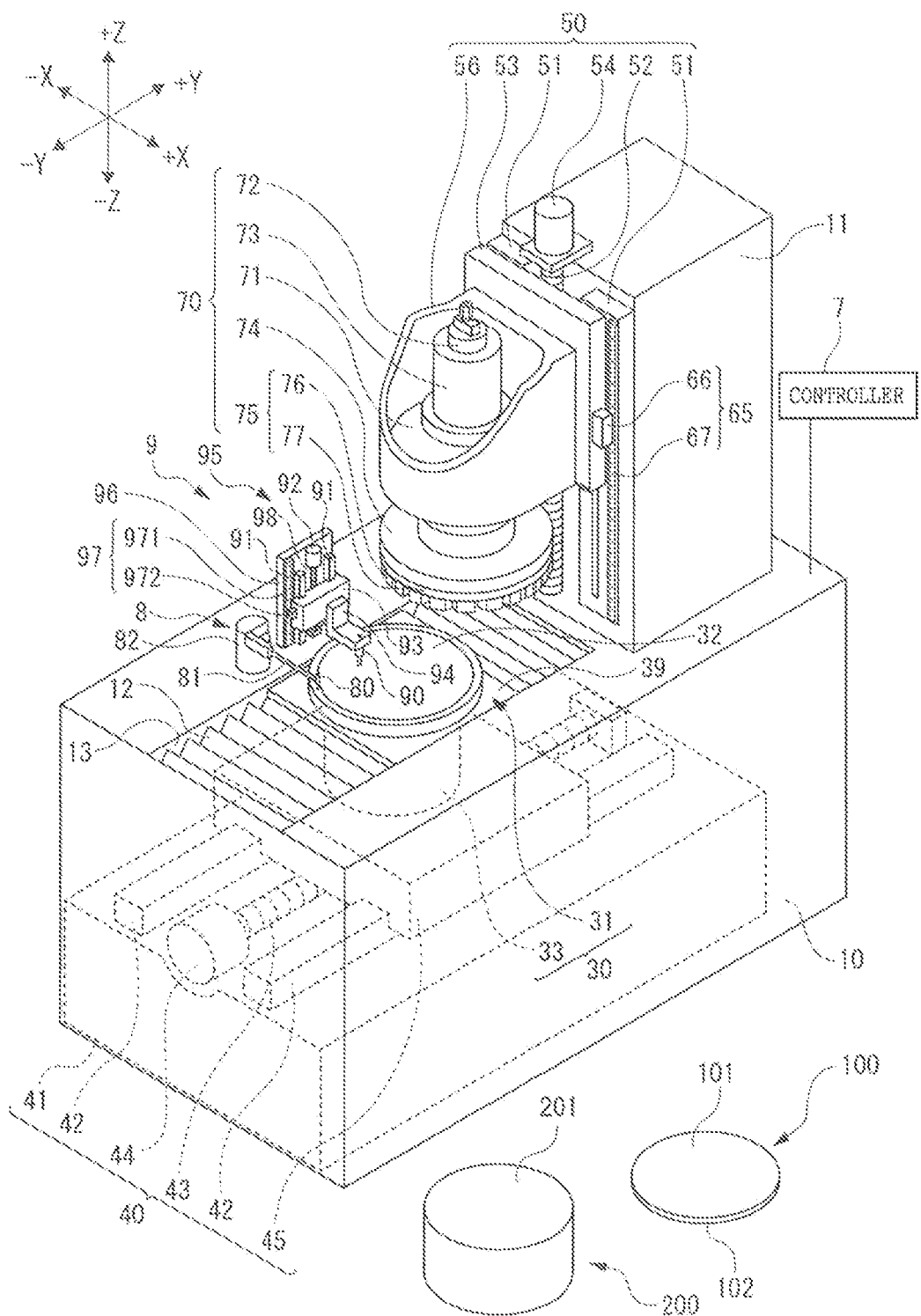
FIG. 1 is a perspective view of a grinding apparatus that carries out a method of grinding a workpiece according to an embodiment of the present invention.

As illustrated in FIG. 1, a grinding apparatus 1 that carries out a method of grinding a workpiece according to a preferred embodiment of the present invention is an apparatus for grinding a semiconductor ingot (hereinafter simply referred to as "ingot") 200 or a semiconductor wafer (hereinafter simply referred to as "wafer") 100 as a workpiece. The ingot 200 may be an ingot of SiC, for example. The wafer 100 may be a plate-shaped object peeled off from the ingot 200, for example.

As illustrated in FIG. 1, there is established a three-dimensional coordinate system with respect to the grinding apparatus 1. The three-dimensional coordinate system includes an X-axis, a Y-axis, and a Z-axis that extend perpendicularly to each other. The X-axis extends in X-axis directions including a +X direction and a −X direction, the Y-axis extends in Y-axis directions including a +Y direction and a −Y direction, and the Z-axis extends in Z-axis directions including a +Z direction and a −Z direction. The X-axis and the Y-axis extend horizontally whereas the Z-axis extends vertically and perpendicularly to the X-axis and the Y-axis. These directions will be referred to with respect to the grinding apparatus 1 in the description that follows.

The grinding apparatus 1 includes a base 10 shaped as a rectangular parallelepiped, a column 11 extending upwardly from the base 10, and a controller 7 incorporated in the grinding apparatus 1. The base 10 has an opening 13 defined in an upper surface thereof. A holding unit 30 is disposed in the opening 13. The holding unit 30 includes a chuck table 31 having a holding surface 32 for holding a workpiece thereon and a support member 33 that supports the chuck table 31 on its upper end.

The holding surface 32 of the chuck table 31 is held in fluid communication with a suction source, not illustrated, for holding the workpiece under suction thereon. In other words, the holding unit 30 holds the workpiece under suction on the holding surface 32.

The chuck table 31 is rotatable by the support member 33 disposed there beneath about a central table axis that extends in the Z-axis directions through the center of the holding surface 32 while the workpiece is being held on the holding surface 32. Therefore, the workpiece is held on the holding surface 32 and rotatable about an axis extending through the center of the holding surface 32.

As illustrated in FIG. 1, the chuck table 31 is horizontally surrounded by a cover plate 39. A bellows plate 12 that can be expanded and contracted in the Y-axis directions is coupled to opposite ends of the cover plate 39 in the opening 13. The holding unit 30 is disposed on a Y-axis moving mechanism 40 that is housed in the base 10 below the holding unit 30.

The Y-axis moving mechanism 40 represents an example of a horizontal moving mechanism. The Y-axis moving mechanism 40 moves the holding unit 30 and the grinding unit 70 relatively to each other in the Y-axis directions parallel to the holding surface 32. According to the present embodiment, the Y-axis moving mechanism 40 is arranged to move the holding unit 30 in the Y-axis directions with respect to the grinding unit 70. The horizontal moving mechanism may be a turntable with a plurality of holding units 30 disposed thereon.

The Y-axis moving mechanism 40 includes a pair of Y-axis guide rails 42 parallel to the Y-axis directions, a Y-axis movable table 45 slidable on and along the Y-axis guide rails 42, a Y-axis ball screw 43 extending parallel to the Y-axis guide rails 42, a Y-axis servomotor 44 connected to the Y-axis ball screw 43, and a holding base 41 that holds the Y-axis guide rails 42, the Y-axis ball screw 43, and the Y-axis servomotor 44 thereon.

The Y-axis movable table 45 is slidably disposed on the Y-axis guide rails 42. A nut, not illustrated, is fixedly mounted on a lower surface of the Y-axis movable table 45 and operatively threaded over the Y-axis ball screw 43. The Y-axis servomotor 44 is coupled to an end of the Y-axis ball screw 43.

As illustrated in FIG. 1, when the Y-axis servomotor 44 is energized, it rotates the Y-axis ball screw 43 about its central axis that extends horizontally, causing the nut to move the Y-axis movable table 45 in one of the Y-axis directions along the Y-axis guide rails 42. The support member 33 of the holding unit 30 is mounted on the Y-axis movable table 45. Consequently, as the Y-axis movable table 45 moves in one of the Y-axis directions, the holding unit 30 including the chuck table 31 also moves in the same Y-axis direction.

According to the present embodiment, the holding unit 30 is moved along the Y-axis directions by the Y-axis moving mechanism 40 generally between a between a workpiece placing area as a front area in the −Y direction where the workpiece is placed on the holding surface 32 of the chuck table 31 and a grinding area as a rear area in the +Y direction where the workpiece on the holding surface 32 is ground.

Furthermore, as illustrated in FIG. 1, the column 11 is erected on the base 10 in a rear area in the +Y direction. The grinding unit 70 for grinding the workpiece on the chuck table 31 and a grinding feed mechanism 50 are mounted on a front surface of the column 11. The grinding feed mechanism 50 operates to move the holding unit 30 and the grinding unit 70 relatively to each other in the Z-axis directions, i.e., grinding feed directions, perpendicular to the holding surface 32. According to the present embodiment, the grinding feed mechanism 50 operates to move the grinding unit 70 relatively to the holding unit 30 in the Z-axis directions.

The grinding feed mechanism 50 includes a pair of Z-axis guide rails 51 parallel to the Z-axis directions, a Z-axis movable plate 53 slidable on and along the Z-axis guide rails 51, a Z-axis ball screw 52 extending parallel to the Z-axis guide rails 51, a Z-axis servomotor 54, and a support case 56 mounted on a front surface, i.e., a face side, of the Z-axis movable plate 53 and supporting the grinding unit 70 thereon.

The Z-axis movable plate 53 is slidably disposed on the Z-axis guide rails 51. A nut, not illustrated, is fixedly mounted on a rear surface, i.e., a reverse side, of the Z-axis movable plate 53 and operatively threaded over the Z-axis ball screw 52. The Z-axis servomotor 54 is coupled to an end of the Z-axis ball screw 52.

When the Z-axis servomotor 54 is energized, it rotates the Z-axis ball screw 52 about its central axis that extends vertically, causing the nut to move the Z-axis movable plate 53 in one of the Z-axis directions along the Z-axis guide rails 51. Therefore, when the Z-axis movable plate 53 moves in one of the Z-axis directions, the support case 56 mounted on the Z-axis movable plate 53 and the grinding unit 70 supported on the support case 56 also move with the Z-axis movable plate 53 in the same Z-axis direction.

The grinding unit 70 represents an example of a processing unit. AS illustrated in FIG. 1, the grinding unit 70 includes a spindle housing 71 fixed to the support case 56, a spindle 72 rotatably held by the spindle housing 71, a rotating motor 73 for rotating the spindle 72 about its central axis that extends vertically, a wheel mount 74 attached to a lower end of the spindle 72, and a grinding wheel 75 supported on the wheel mount 74.

The spindle housing 71 is held in the support case 56 and extends in the Z-axis directions. The spindle 72 extends in the Z-axis directions perpendicularly to the holding surface 32 of the chuck table 31, and is rotatably supported by the spindle housing 71.

The rotating motor 73 is coupled to an upper end of the spindle 72. When the rotating motor 73 is energized, it rotates the spindle 72 about an axis 701 (see FIG. 2) as its central axis extending in the Z-axis directions. The wheel mount 74 is shaped as a circular plate and fixed to a lower end, i.e., a distal end, of the spindle 72. The wheel mount 74 supports the grinding wheel 75 on a lower surface thereof.

The grinding wheel 75 is of substantially the same diameter as the wheel mount 74. The grinding wheel 75 includes a wheel base 76 made of a metal material such as aluminum alloy or the like and an annular array of grindstones 77 fixed to a lower surface of the wheel base 76 along an entire circumferential edge thereof. When the annular array of grindstones 77 is held in contact with a surface to be ground of a workpiece, i.e., a first surface 201 of the ingot 200 or a surface of the wafer 100, held on the chuck table 31 disposed in the grinding area, and is rotated about its central axis by the rotating motor 73 through the spindle 72, the wheel mount 74, and the wheel base 76, the grindstones 77 grind the surface to be ground of the workpiece.

Furthermore, as illustrated in FIG. 1, a linear scale 65 for measuring the vertical position of the grinding unit 70 is disposed on the column 11. The linear scale 65 includes a reader 66 mounted on the Z-axis movable plate 53 for movement therewith in the Z-axis directions and a scale element 67 disposed on a front surface of one of the Z-axis guide rails 51. When the linear scale 65 is in operation, the reader 66 reads graduations of the scale element 67 to detect the vertical position of the grinding unit 70 as it is moved by the grinding feed mechanism 50.

As illustrated in FIG. 1, a holding surface height measuring mechanism 8 for measuring the height of the holding surface 32 of the holding unit 30 is disposed on the upper surface of the base 10 alongside the opening 13. The holding surface height measuring mechanism 8 includes a housing 82 disposed on the upper surface of the base 10 on one side of the opening 13 in the −X direction, an arm 81 coupled to a side face of the housing 82, and a probe 80 mounted on the distal end of the arm 81. The holding surface height measuring mechanism 8 can measure the height of the holding surface 32 by having the lower end of the probe 80 contact the holding surface 32. The holding surface height measuring mechanism 8 may alternatively include a non-contact rangefinder, i.e., a laser rangefinder, for example, instead of the probe 80.

An upper surface height measuring mechanism 9 for measuring the height of the upper surface of a workpiece is disposed on the upper surface of the workpiece in the vicinity of the holding surface height measuring mechanism 8. The upper surface height measuring mechanism 9 represents an example of a height gauge, and includes a probe 90 as a measuring element and a probe moving mechanism 95 for lifting and lowering the probe 90 in the Z-axis directions.

The probe moving mechanism 95 includes a back plate 96 erected on the base 10, a pair of guide rails 91 disposed on a front surface of the back plate 96 and extending parallel to the Z-axis directions, a movable plate 93 slidable on the guide rails 91, a ball screw 98 extending parallel to the guide rails 91, an electric motor 92, and an L-shaped jig 94 mounted on a front surface, i.e., a face side, of the movable plate 93. The L-shaped jig 94 supports the probe 90 on a lower surface thereof.

The movable plate 93 is slidably disposed on the guide rails 91. A nut, not illustrated, is fixedly disposed on a rear surface, i.e., a reverse side, of the movable plate 93 and operatively threaded over the ball screw 98. The electric motor 92 is coupled to an end of the ball screw 98.

The probe moving mechanism 95 operates as follows. When the electric motor 92 is energized, it rotates the ball screw 98, causing the nut to move the movable plate 93 along the guide rails 91 in one of the Z-axis directions. The L-shaped jig 94 mounted on the movable plate 93 and the probe 90 supported on the L-shaped jig 94 are also moved with the movable plate 93 in the same Z-axis direction.

A linear scale 97 is disposed on a side surface of the back plate 96 that faces in the +X direction at a position adjacent to one of the guide rails 91. The linear scale 97 includes a reader 972 mounted on the movable plate 93 for movement therewith in the Z-axis directions and a scale element 971 disposed on the face side of the back plate 96. The scale element 971 extends parallel to the guide rail 91 that is positioned adjacent to the linear scale 97.

The upper surface height measuring mechanism 9 operates as follows. The probe moving mechanism 95 moves the probe 90 into contact with a surface to be ground of a workpiece, e.g., the first surface 201 of the ingot 200, held on the holding surface 32 of the chuck table 31. Then, the reader 972 reads graduations of the scale element 971 to recognize the height or vertical position of the movable plate 93. The height of the first surface 201 of the ingot 200 can be measured on the basis of the height of the movable plate 93. If the workpiece to be ground is the wafer 100, then the upper surface height measuring mechanism 9 measures the height of an upper surface of the wafer 100 in a similar fashion.

According to the present embodiment, the thickness of the workpiece on the holding surface 32 can be calculated by subtracting the height of the holding surface 32 measured by the holding surface height measuring mechanism 8 from the height of the upper surface of the workpiece measured by the upper surface height measuring mechanism 9.

The controller 7 includes a central processing unit (CPU) for performing arithmetic processing operations according to control programs and a storage medium such as a memory or the like for storing the control programs and various data. The controller 7 controls the components described above of the grinding apparatus 1 to perform a grinding process on the ingot 200 or the wafer 100.

The grinding process that is carried out by the grinding apparatus 1 will be described below. The grinding process is performed as a method of grinding a workpiece, also referred to as a workpiece grinding method, according to the present embodiment to grind a surface to be ground that has surface irregularities of the workpiece held by the holding unit 30.

The workpiece grinding method according to the present embodiment includes an ingot planarizing step that planarizes the first surface 201 to be ground of the ingot 200, a peeling step that peels off the wafer 100 from the ingot 200, and a wafer planarizing step that planarizes a surface to be ground of the wafer 100 peeled off from the ingot 200.

(1) Ingot Planarizing Step

The first surface 201 of the ingot 200 that has not been planarized has surface irregularities. In the ingot planarizing step, the grinding apparatus 1 grinds the first surface 201 of the ingot 200 to planarize the first surface 201. Specifically, the operator of the grinding apparatus 1 places the ingot 200 with its first surface 201 to be ground facing upwardly on the holding surface 32 of the holding unit 30 that is placed in the workpiece placing area as the front area in the −Y direction. Then, the controller 7 brings the holding surface 32 into fluid communication with the suction source, not illustrated, in response to a command from the operator. The controller 7 now holds the ingot 200 under suction on the holding surface 32 of the holding unit 30 (holding step).

Then, the controller 7 controls the Y-axis moving mechanism 40 to move the holding unit 30 into the grinding area as the rear area in the +Y direction in order to place the first surface 201 of the ingot 200 held on the holding surface 32 below the grindstones 77 of the grinding unit 70. The controller 7 energizes the rotating motor 73 of the grinding unit 70 to rotate the spindle 72 about its central axis. The grindstones 77 of the grinding wheel 75 that is connected to the spindle 72 through the wheel mount 74 are now rotated about the central axis of the spindle 72. Furthermore, the controller 7 controls the support member 33 of the holding unit 30 to rotate the chuck table 31 about its central axis.

Then, the controller 7 controls the grinding feed mechanism 50 to bring the rotating grindstones 77 into contact with the first surface 201 of the ingot 200 held on the rotating holding surface 32. In this manner, the controller 7 grinds the first surface 201 of the ingot 200 by a predetermined amount of stock removal with the grindstones 77 (first grinding step). The predetermined amount of stock removal has been preset by the operator, for example.

Specifically, prior to the first grinding step, the measuring element of the height gauge, i.e., the probe 90 of the upper surface height measuring mechanism 9, is brought into contact with the first surface 201 of the ingot 200 held on the holding surface 32 while the chuck table 31 is not being rotated, and then the upper surface height measuring mechanism 9 measures the height of the first surface 201 of the ingot 200. Then, the controller 7 controls the grindstones 77 to grind the first surface 201 of the ingot 200 by the predetermined amount of stock removal from the measured height of the first surface 201 of the ingot 200.

After the height of the surface to be ground has been measured, the measuring element of the height gauge is spaced from the surface to be ground. Thereafter, the grindstones 77 may grind the workpiece while the measuring element of the height gauge is being kept out of contact with the surface to be ground in the first grinding step. In other words, according to the present embodiment, the controller 7 carries out the first grinding step while keeping the probe 90 of the upper surface height measuring mechanism 9 out of contact with the first surface 201 of the ingot 200.

After the first grinding step, the controller 7 brings the probe 90 of the upper surface height measuring mechanism 9 into contact with the first surface 201 of the ingot 200 ground in the first grinding step at a plurality of locations thereon. At this time, the controller 7 brings the probe 90 into contact with the first surface 201 of the ingot 200 while controlling the support member 33 to rotate the ingot 200 in unison with the chuck table 31 or controls the Y-axis moving mechanism 40 to move the ingot 200 in unison with the chuck table 31 in one of the Y-axis directions. The controller 7 can thus bring the probe 90 into contact with the first surface 201 of the ingot 200 at a plurality of locations thereon.

In this fashion, the controller 7 measures the height of the first surface 201 of the ingot 200 at the plurality of locations using the upper surface height measuring mechanism 9. Then, the controller 7 measures a height difference of the surface irregularities on the first surface 201 on the basis of the measured height (height difference measuring step).

Thereafter, the controller 7 assesses the measured height difference of the surface irregularities. Specifically, if the height difference of the surface irregularities falls within a preset range, i.e., an allowable range, then the controller 7 determines that the first surface 201 of the ingot 200 has been planarized, and stops grinding the first surface 201 of the ingot 200.

On the other hand, if the height difference of the surface irregularities is larger than the allowable range, i.e., falls out of the allowable range, then the controller 7 grinds the first surface 201 of the ingot 200 with the grindstones 77 while keeping the probe 90 of the upper surface height measuring mechanism 9 in contact with the first surface 201 of the ingot 200, i.e., while having the upper surface height measuring mechanism 9 continue to measure the height difference of the surface irregularities. The controller 7 continuously grinds the first surface 201 of the ingot 200 with the grindstones 77 until the height difference of the surface irregularities measured by the upper surface height measuring mechanism 9 comes into the allowable range. In this manner, the first surface 201 of the ingot 200 is planarized (second grinding step).

Figure 2:
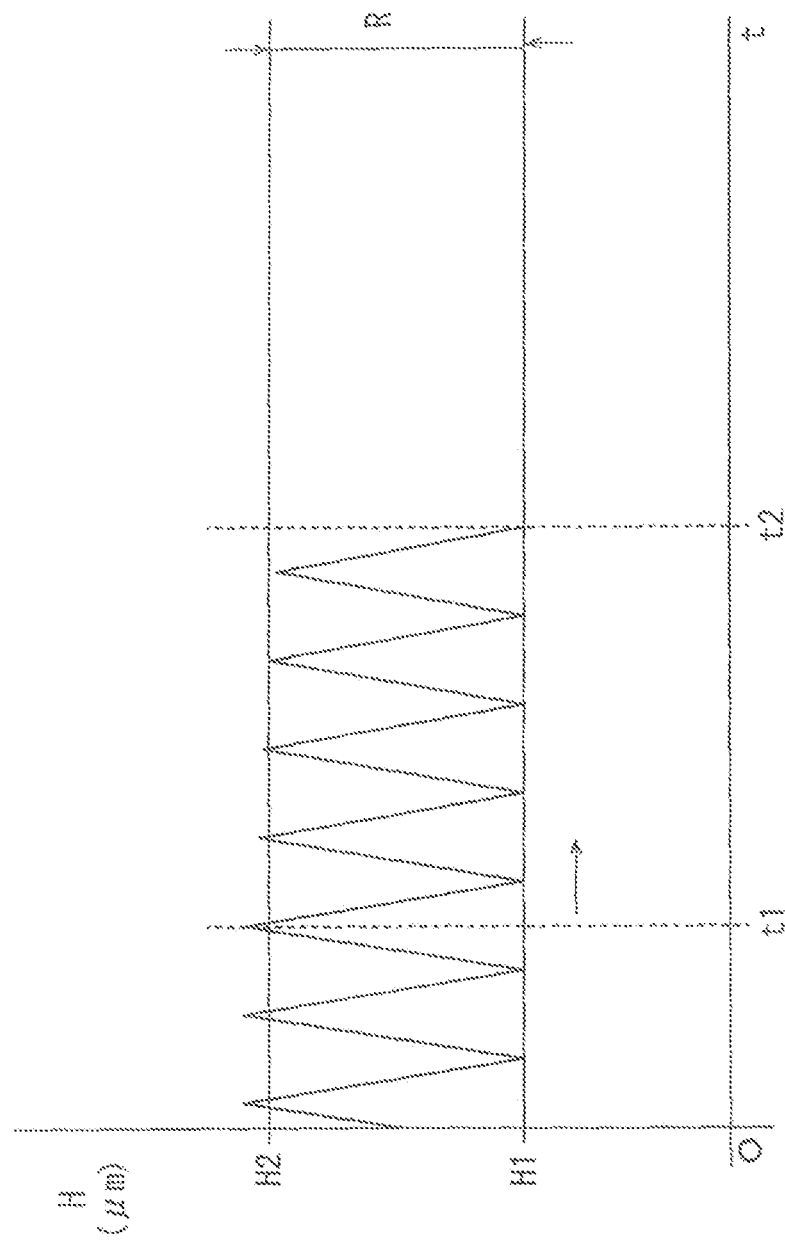
FIG. 2 is a graph illustrating an example of the relationship between the height of a first surface of an ingot and time, the height being measured in a height difference measuring step and a second grinding step of the method.

FIG. 2 illustrates a graph representing an example of the relationship between the height (H: μm) of the first surface 201 of the ingot 200 that is measured by the upper surface height measuring mechanism 9 and time (t) in the height difference measuring step and the second grinding step. In the example represented by the graph illustrated in FIG. 2, the height difference measuring step is carried out until time t1, and the height difference measuring step ends and the grinding step starts at time t1.

In the example represented by the graph illustrated in FIG. 2, during the height difference measuring step up to time t1, the height difference of the surface irregularities of the first surface 201 that are measured, i.e., the height difference of heights (H) that are measured, falls out of an allowable range R defined between an upper limit value H2 and a lower limit value depending on the minimum value of the measured heights (H). Specifically, the maximum value of the measured heights (H) of the first surface 201 exceeds the upper limit value H2.

During the grinding step that starts from time t1, the maximum value of the measured heights (H) of the first surface 201 gradually becomes closer to the upper limit value H2 over time, and is smaller than the upper limit value H2 at time t2. In this example, the controller 7 determines that the height difference of the surface irregularities of the first surface 201 that are measured, i.e., the height difference of heights (H) that are measured, comes into the allowable range R at time t2, and finishes the second grinding step.

(2) Peeling Step

In the peeling step, the wafer 100 is peeled off from the ingot 200 whose first surface 201 has been planarized in the ingot planarizing step.

Figure 3:
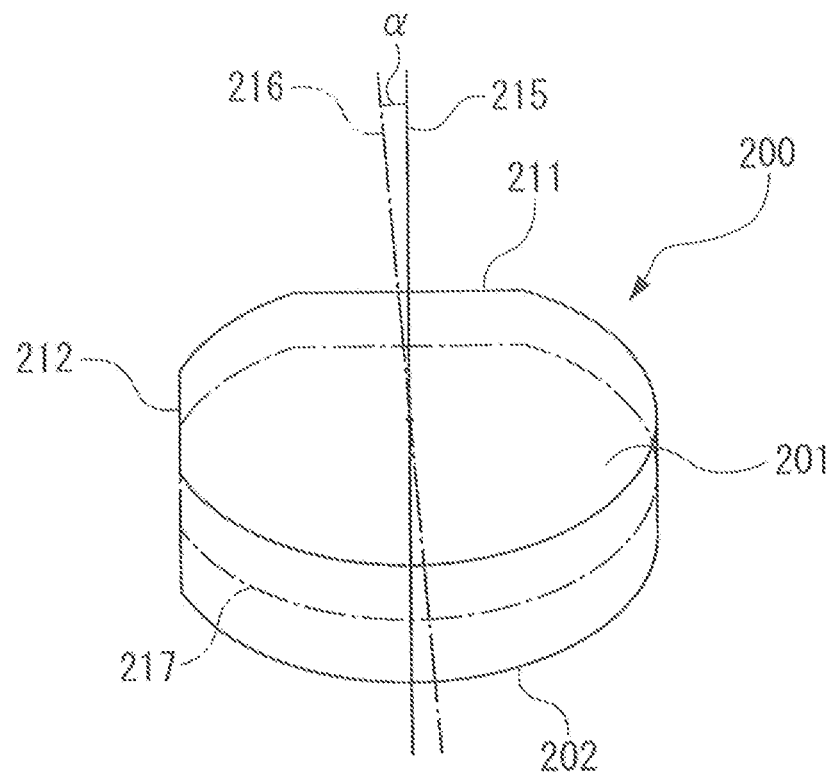
FIG. 3 is a perspective view of an ingot.
Figure 4:
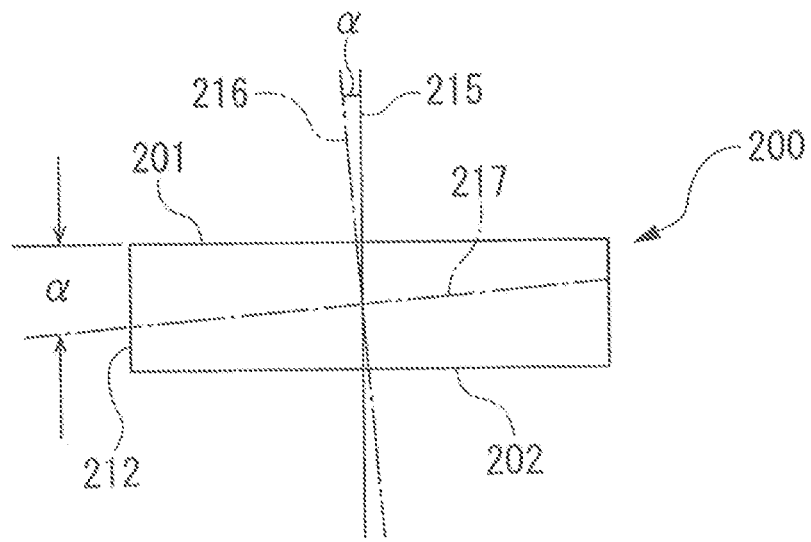
FIG. 4 is a front elevational view of the ingot.

The structural details of the ingot 200 will be described in detail below. FIGS. 3 and 4 illustrate the ingot 200. The ingot 200 is made of a single crystal of silicon carbide (SiC), i.e., an ingot made of a hexagonal single crystal of silicon carbide, for example. The ingot 200 has the first surface 201 referred to above and a second surface, i.e., a reverse side, 202 opposite the first surface 201. As described above, the first surface 201 of the ingot 200 has been planarized in the ingot planarizing step, and is to be irradiated with a laser beam as described later.

The ingot 200 has on its outer circumferential surface a first orientation flat 211 and a second orientation flat 212 that extends perpendicularly to the first orientation flat 211. The first orientation flat 211 is longer than the second orientation flat 212.

The ingot 200 has a c-axis 216 and a c-plane 217 lying perpendicularly to the c-axis 216. The c-axis 216 extends from the first surface 201 to the second surface 202 and is inclined an off-angle α to a line 215 normal to the first surface 201. The c-plane 217 is inclined the off-angle α to the first surface 201. According to the present embodiment, the c-axis 216 is inclined in a direction perpendicular to the direction in which the shorter second orientation flat 212 extends.

The c-plane 217 is established as countless planes in the ingot 200 at molecular levels of the ingot 200. According to the present embodiment, the off-angle α is set to 4°. However, the off-angle α is not limited to 4°, but may be freely set to a degree in the range from 1° to 6°.

Figure 5:
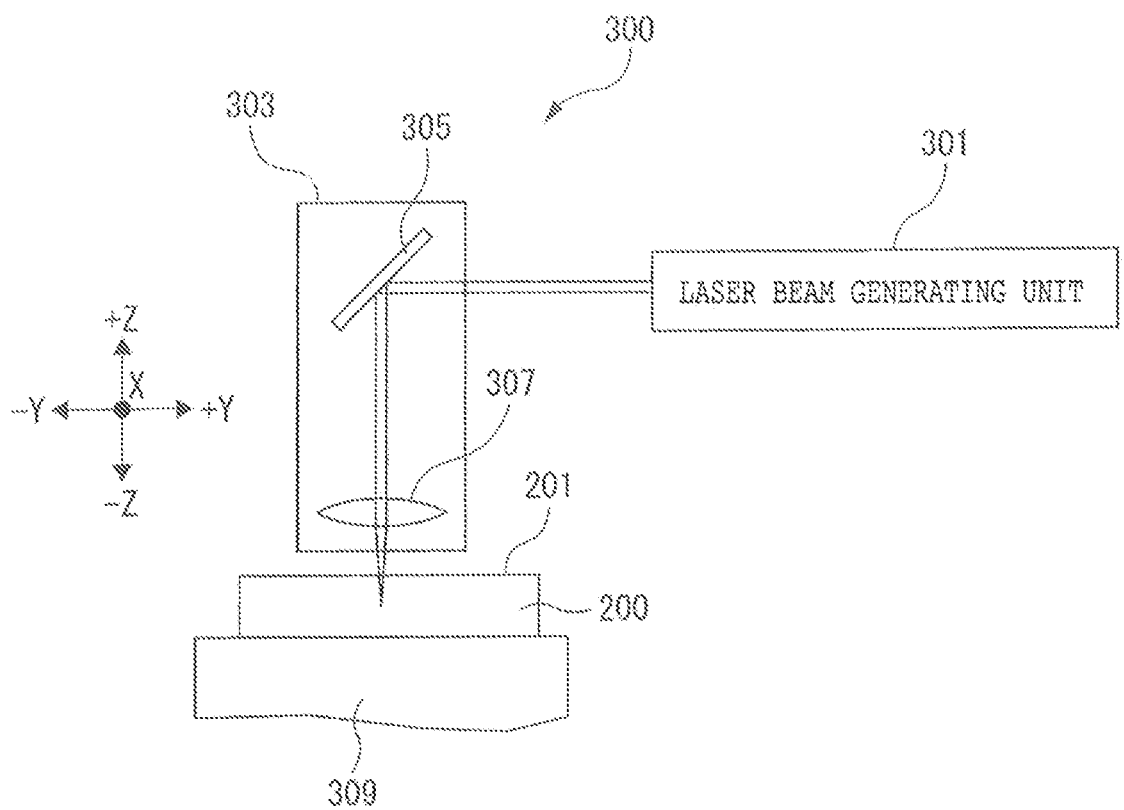
FIG. 5 is a schematic side elevational view of a portion of a laser processing apparatus.

In the peeling step according to the present embodiment, a laser beam is applied to the ingot 200 to form modified layers in the ingot 200. According to the present embodiment, a laser processing device 300 illustrated in FIG. 5 is used to apply a laser beam to the ingot 200.

The laser processing device 300 includes a laser beam generating unit 301 that generates a laser beam that has a wavelength transmittable through the ingot 200, a beam condenser 303 that applies the laser beam toward the ingot 200, and a support table 309 that supports the ingot 200 thereon.

The laser beam generated by the laser beam generating unit 301 is reflected by a reflecting mirror 305 of the beam condenser 303 to travel in the −Z direction to a condensing lens 307. The condensing lens 307 focuses and applies the laser beam to the ingot 200 on the support table 309.

In the laser processing device 300, the laser beam generating unit 301, the beam condenser 303, and the support table 309 are movable relatively to each other along the X-axis directions and the Y-axis directions.

The focused spot of the laser beam is processing-fed in one of the X-axis directions when the laser beam generating unit 301, the beam condenser 303, and the support table 309 are moved relatively to each other along the X-axis directions. Therefore, the X-axis directions represent processing-feed directions of the laser processing device 300. The ingot 200 on the support table 309 is processed by the laser beam applied thereto when the focused spot of the laser beam is linearly moved in one of the X-axis directions relatively to the ingot 200.

Furthermore, the focused spot of the laser beam is indexing-fed in one of the Y-axis directions when the laser beam generating unit 301, the beam condenser 303, and the support table 309 are moved relatively to each other along the Y-axis directions.

Figure 6:
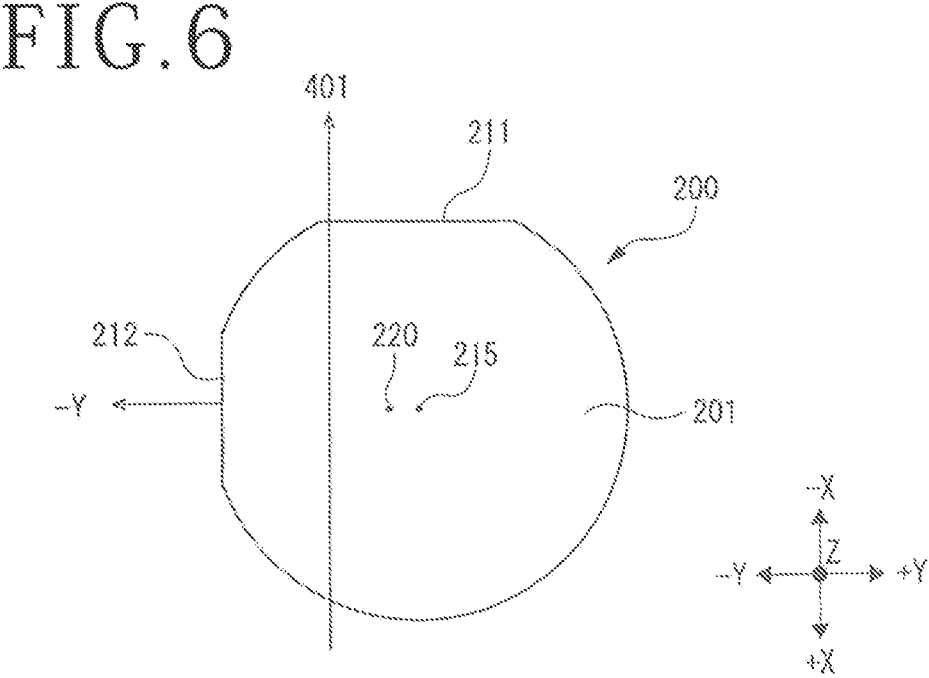
FIG. 6 is a plan view of the ingot.

In the peeling step according to the present embodiment, as illustrated in FIG. 5, the ingot 200 is placed on the support table 309 of the laser processing device 300 such that the laser beam from the beam condenser 303 is applied to the first surface 201 of the ingot 200. Specifically, as illustrated in FIG. 6, the ingot 200 is fixedly placed on the support table 309 such that the second orientation flat 212 extends in the X-axis directions.

More specifically, the ingot 200 is held on the support table 309 such that the direction perpendicular to the −Y direction in which the off-angle α is formed, i.e., the direction that extends through the line 215 normal to the first surface 201 of the ingot 200 and a point 220 of intersection between the c-axis 216 and the first surface 201, or the direction indicated by the arrow 401, lies parallel to the X-axis directions (holding step in the peeling step). The point 220 of intersection refers to a point of intersection between the first surface 201 and the c-axis 216 that intersects with the line 215 normal to the first surface 201 on the c-plane 217 (see FIG. 4).

The laser beam scans the first surface 201 of the ingot 200 along the direction perpendicular to the direction in which the off-angle α is formed, i.e., the direction indicated by the arrow 401, so that the focused spot of the laser beam is linearly moved relatively to the first surface 201. According to the present embodiment, the directions perpendicular to the −Y direction in which the off-angle α is formed, i.e., the X-axis directions, represent the processing-feed directions of the support table 309.

The focused spot of the laser beam applied from the beam condenser 303 to the ingot 200 is positioned at a depth in the ingot 200 that corresponds to the thickness of the wafer 100 to be peeled off from the ingot 200. The focused spot of the laser beam and the ingot 200 are linear moved relatively to each other along the X-axis directions perpendicular to the −Y direction in which the off-angle α is formed, thereby forming modified layers in the ingot 200 (modified layer forming step) at the depth referred to above.

Then, the focused spot of the laser beam and the ingot 200 are moved, i.e., indexing-fed, relatively to each other by a preset indexing distance, i.e., a predetermined distance, in the −Y direction in which the off-angle α is formed (indexing-moving step). Thereafter, the modified layer forming step and the indexing-moving step are repeatedly carried out.

Figure 7:
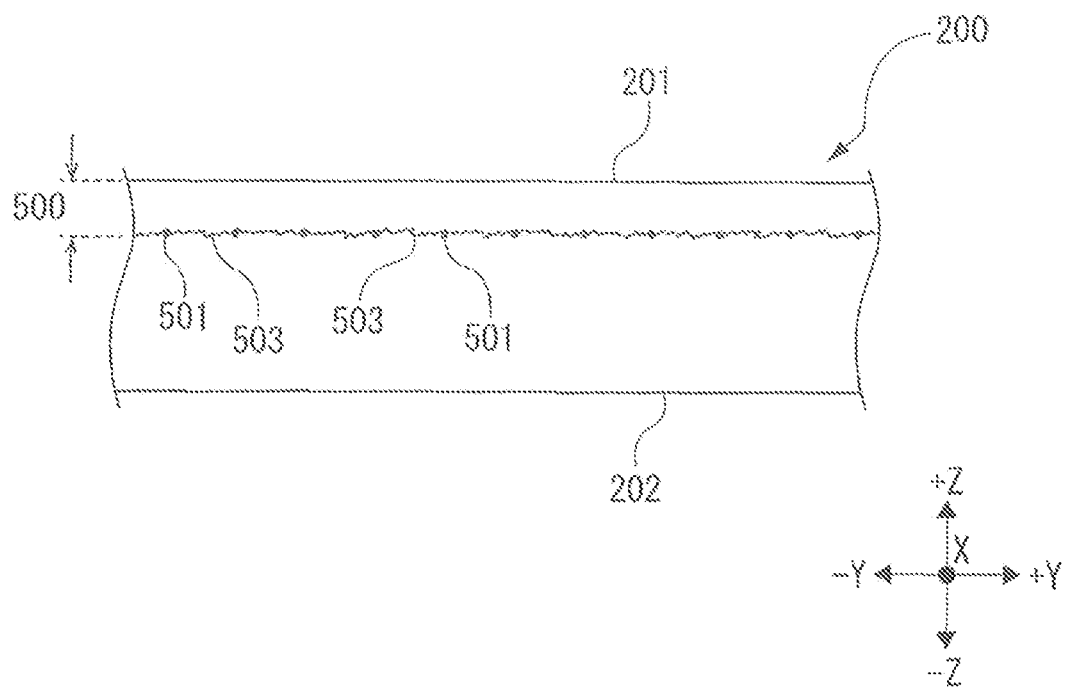
FIG. 7 is a cross-sectional view illustrating a modified layer forming step of the method.
Figure 8:
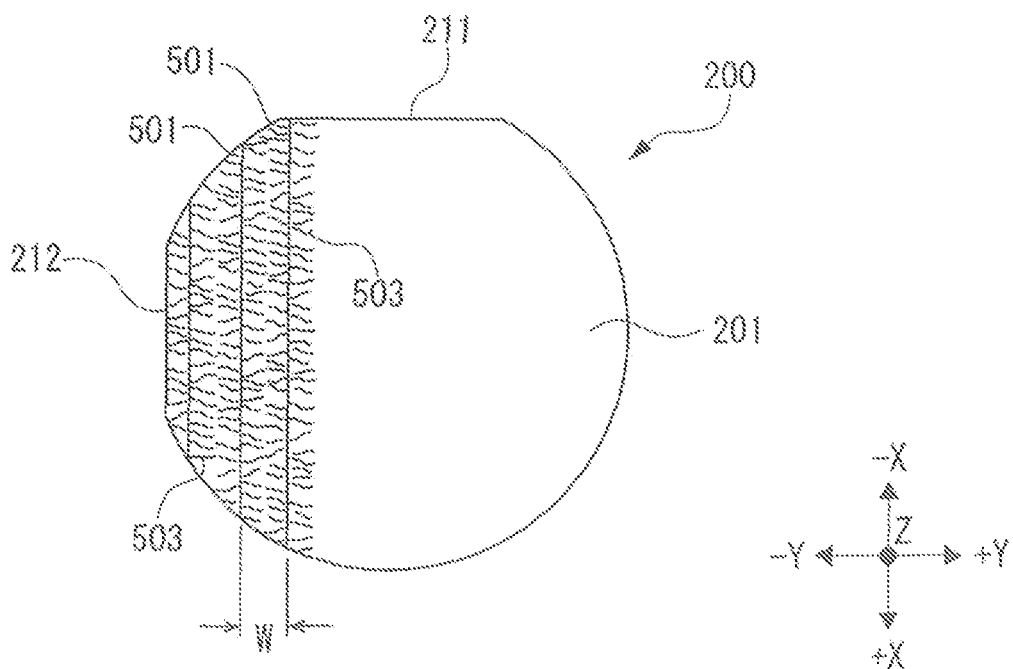
FIG. 8 is a plan view illustrating the modified layer forming step.

By repeating the modified layer forming step and the indexing-moving step, as illustrated in FIGS. 7 and 8, a plurality of modified layers 501 are formed linearly along the X-axis directions in the ingot 200 at a depth corresponding to the thickness 500 of the wafer 100 to be peeled off from the ingot 200. Each of the modified layers 501 is spaced from an adjacent one thereof by an indexing distance W along the Y-axis directions. At the same time, cracks 503 extending from the modified layers 501 in the Y-axis directions are formed in the ingot 200 parallel to the c-plane 217. The modified layers 501 and the cracks 503 act as division initiating points where the wafer 100 will be peeled off from the ingot 200.

The laser beam from the beam condenser 303 is applied all over to the first surface 201 of the ingot 200 to form division initiating points of the modified layers 501 and the cracks 503 in the ingot 200. Thereafter, external forces are applied to the division initiating points, peeling off the wafer 100 as a plate-shaped object from the ingot 200 along the division initiating points as a boundary. For example, a known pressing mechanism as disclosed in Japanese Patent No. 6355540 may be used to apply torsional stresses to the ingot 200 to rupture the ingot 200 along the division initiating points of the modified layers 501 and the cracks 503 to peel off the wafer 100 from the ingot 200.

(3) Wafer Planarizing Step

The wafer 100 that has been peeled off from the ingot 200 in the peeling step has a first wafer surface 101 and a second wafer surface 102 that is a surface, i.e., a reverses side, opposite the first wafer surface 101. The first wafer surface 101 is the first surface 201 of the ingot 200 and has been planarized in the ingot planarizing step. On the other hand, the second wafer surface 102 is a surface that has been peeled off from the ingot 200 in the peeling step, also referred to as a peeled-off surface, and has surface irregularities. In the wafer planarizing step, the second wafer surface 102 of the wafer 100 is planarized.

The wafer planarizing step is similar to the ingot planarizing step described above. In the wafer planarizing step, the operator places the wafer 100 with its second wafer surface 102 to be ground facing upwardly on the holding surface 32 of the holding unit 30 (see FIG. 1). In other words, the first wafer surface 101 of the wafer 100 that has been planarized is held on the holding surface 32. The controller 7 controls the suction source to apply a vacuum to the holding surface 32 to hold the wafer 100 under suction thereon (holding step).

As with the first grinding step in the ingot planarizing step, the controller 7 controls the grinding feed mechanism 50 to bring the rotating grindstones 77 into contact with the second wafer surface 102 of the wafer 100 held on the rotating holding surface 32. In this manner, the controller 7 grinds the second wafer surface 102 of the wafer 100 by a predetermined amount of stock removal with the grindstones 77 (first grinding step).

At this time, the controller 7 calculates the predetermined amount L of stock removal according to the following equation (amount-of-stock-removal calculating step):

$$\text{Amount } L \text{ of stock removal} = \text{indexing distance } W \times \tan(\text{off-angle } \alpha) \quad (1)$$

where the indexing distance W refers to the distance over which the focused spot of the laser beam is moved in the −Y direction in the indexing-moving step in the peeling step, and the off-angle α refers to the off-angle α illustrated in FIG. 3.

Figure 9:
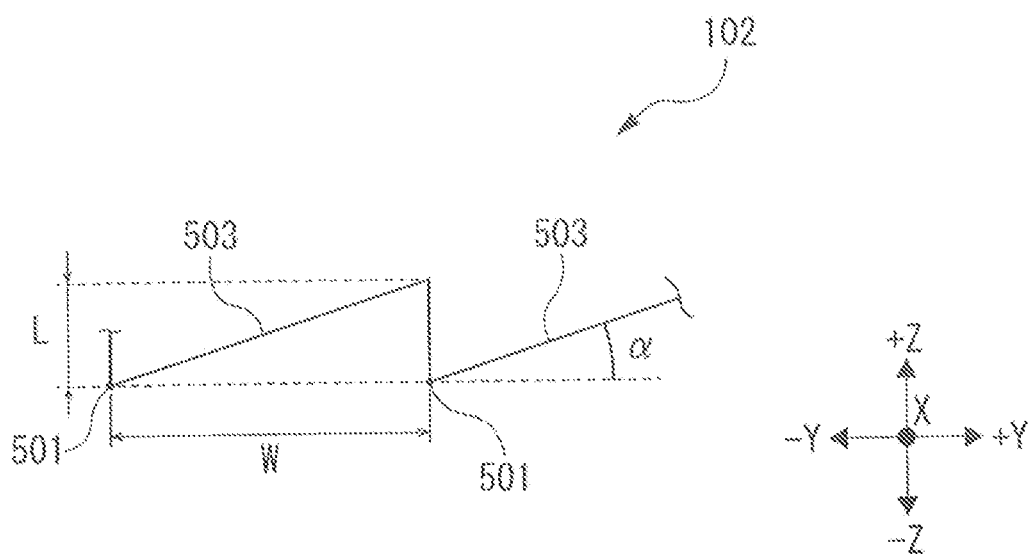
FIG. 9 is a cross-sectional view illustrating a predetermined material removal rate in a first grinding step of the method.

Specifically, as illustrated in FIG. 9, modified layers 501 are formed at spaced intervals each corresponding to the indexing distance W on the second wafer surface 102 along which the wafer 100 has been peeled off from the ingot 200 in the peeling step. Cracks 503 are also formed on both sides of each of the modified layers 501, i.e., between the modified layers 501. As the planarized first wafer surface 101 is held in contact with the holding surface 32, the cracks 503 are inclined the off-angle α to the horizontal directions, i.e., the directions parallel to the holding surface 32, on the second wafer surface 102 to be ground. Therefore, the second wafer surface 102 has surface irregularities whose height depends on the amount L of stock removal represented by the equation (1).

Consequently, the second wafer surface 102 can be planarized by being ground by the amount L of stock removal represented by the equation (1) as the predetermined amount of stock removal in the first grinding step. If the indexing distance is 400 μm and the off-angle α is 4°, then the amount L of stock removal is approximately 27.97 μm.

The controller 7 sets the predetermined amount of stock removal as described above, and then carries out the first grinding step. In other words, the predetermined amount of stock removal is set before the first grinding step is carried out.

Next, as with the ingot planarizing step, the controller 7 carries out a height difference measuring step to measure a height difference of surface irregularities on the second wafer surface 102 of the wafer 100. Then, if the height difference of the surface irregularities falls within a preset range, i.e., an allowable range, then the controller 7 determines that the second wafer surface 102 of the wafer 100 has been planarized, and brings the grinding process to an end.

On the other hand, if the height difference of the surface irregularities is larger than the allowable range, i.e., falls out of the allowable range, then the controller 7 grinds the second wafer surface 102 of the wafer 100 with the grindstones 77 while having the upper surface height measuring mechanism 9 continue to measure the height difference of the surface irregularities. In this manner, the second wafer surface 102 of the wafer 100 is planarized (second grinding step).

The ingot 200 from which the wafer 100 has been peeled off also has surface irregularities on its peeled-off surface. The operator carries out the above ingot planarizing step on the peeled-off surface, and then carries out the peeling step and the wafer planarizing step. In this manner, a plurality of wafers 100 each having both surfaces planarized can be obtained from the ingot 200.

According to the present embodiment, in each of the ingot planarizing step and the wafer planarizing step, the first grinding step is carried out to grind the first surface 201 of the ingot 200 or the second wafer surface 102 of the wafer 100 by a predetermined amount of stock removal, after which the height of the ground surface is measured by the upper surface height measuring mechanism 9. In other words, the surface to be ground is planarized, i.e., ground, before the height of the ground surface is measured by the upper surface height measuring mechanism 9. Consequently, the probe 90 of the upper surface height measuring mechanism 9 is restrained from bouncing off the ground surface and hence from finding it difficult to measure the height of the ground surface. In the second grinding step, therefore, it is possible to grind the workpiece with the grindstones 77 of the grinding unit 70 until the height difference of the surface irregularities measured by the upper surface height measuring mechanism 9 comes into the allowable range.

According to the present embodiment, before the peeling step, the ingot planarizing step is carried out to planarize the first surface 201 of the ingot 200 to which the laser beam is to be applied. Therefore, the modified layers 501 and the cracks 503 for acquiring the wafer 100 as a plate-shaped object to be peeled off from the ingot 200 can well be formed in the ingot 200.

According to the present embodiment, the ingot 200 is made of a hexagonal single crystal of silicon carbide having an off-angle. When the wafer 100 is peeled off as a plate-shaped workpiece from the ingot 200, surface irregularities are formed on the peeled-off surfaces of the ingot 200 and the wafer 100 because of the inclined cracks 503 that are joined together.

According to the present embodiment, the peeled-off surface of the ingot 200 that has the surface irregularities is planarized in the ingot planarizing step. Consequently, the modified layers 501 and the cracks 503 for acquiring a next wafer 100 as a plate-shaped object to be peeled off from the ingot 200 can easily be formed in the ingot 200.

According to the present embodiment, the peeling step and the wafer planarizing step are carried out after the ingot planarizing step has been carried out to planarize the first surface 201 of the ingot 200. However, the ingot planarizing step may be omitted.

In a case where the ingot planarizing step is omitted, the laser beam is applied to the ingot 200 through the first surface 201 that has not been planarized to form division initiating points of modified layers 501 and cracks 503 in the ingot 200 as illustrated in FIG. 7, and then external forces are applied to the division initiating points, peeling off a wafer 100 as a plate-shaped object from the ingot 200 along the division initiating points. The wafer 100 thus obtained has surface irregularities on both the first wafer surface 101 and the second wafer surface 102. Then, the wafer planarizing step is performed on the first wafer surface 101 and the second wafer surface 102, producing a wafer 100 with both surfaces planarized.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. A method of grinding a surface of a workpiece that has surface irregularities with grindstones, comprising:
a holding step of holding the workpiece on a chuck table;
a first grinding step of rotating the workpiece held on the chuck table and grinding the surface of the workpiece with the grindstones by a predetermined amount of stock removal while keeping a measuring element of a height gauge out of contact with the surface of the workpiece;
a height difference measuring step of bringing the measuring element of the height gauge into contact with the surface of the workpiece that has been ground in the first grinding step and measuring a height difference of the surface irregularities on the surface of the workpiece with the height gauge; and
a second grinding step of, if the height difference measured in the height difference measuring step falls within a preset range, stopping grinding of the surface of the workpiece, and, if the measured height difference is larger than the preset range, grinding the surface of the workpiece while keeping the measuring element of the height gauge in contact with the surface of the workpiece until the measured height difference falls within the preset range.

2. The method according to claim 1, wherein the workpiece includes a plate-shaped object peeled off from an ingot made of a single crystal of silicon carbide and having a first surface, a second surface opposite the first surface, a c-axis extending from the first surface to the second surface and inclined at an off-angle to a line normal to the first surface, and a c-plane perpendicular to the c-axis, by repeatedly forming modified layers in the ingot by applying a laser beam having a wavelength transmittable to the ingot through the first surface thereof and linearly moving a focused spot of the laser beam relatively to the ingot in a second direction perpendicular to a first direction in which the off-angle is formed, repeatedly indexing-moving the focused spot of the laser beam relatively to the ingot by a predetermined indexing distance in the first direction, forming division initiating points of the modified layers and cracks extending from the modified layers in the first direction along the c-plane, and applying external forces to the division initiating points to peel off the plate-shaped object along the division initiating points as a boundary, and
the surface of the workpiece that has the surface irregularities includes a surface of the plate-shaped object to be peeled off that is opposite the first surface.

3. The method according to claim 2, further comprising:
before the first grinding step is started, an amount-of-stock removal calculating step of calculating the predetermined amount of stock removal in the first grinding step according to an equation below $$\text{amount of stock removal} = \text{the predetermined indexing distance} \times \tan(\text{off-angle}).$$

4. The method according to claim 1, wherein the workpiece includes an ingot made of a single crystal of silicon carbide and having a first surface, a second surface opposite the first surface, a c-axis extending from the first surface to the second surface and inclined at an off-angle to a line normal to the first surface, and a c-plane perpendicular to the c-axis, by repeatedly forming modified layers in the ingot by applying a laser beam having a wavelength transmittable to the ingot through the first surface thereof and linearly moving a focused spot of the laser beam relatively to the ingot in a second direction perpendicular to a first direction in which the off-angle is formed, repeatedly indexing-moving the focused spot of the laser beam relatively to the ingot by a predetermined indexing distance in the first direction, forming division initiating points of the modified layers and cracks extending from the modified layers in the first direction along the c-plane, and applying external forces to the division initiating points to peel off the plate-shaped object along the division initiating points as a boundary, and
the surface of the workpiece to be ground that has the surface irregularities includes a surface of the ingot from which the plate-shaped object has been peeled off.

5. The method according to claim 4, further comprising:
before the first grinding step is started, an amount-of-stock removal calculating step of calculating the predetermined amount of stock removal in the first grinding step according to an equation below $$\text{amount of stock removal} = \text{the predetermined indexing distance} \times \tan(\text{off-angle}).$$

* * * * *